(12) United States Patent
Anand et al.

(10) Patent No.: US 11,032,692 B2
(45) Date of Patent: Jun. 8, 2021

(54) METHOD AND APPARATUS FOR ROAMING SUBSCRIPTION WITH EMBEDDED SUBSCRIBER IDENTITY MODULE

(71) Applicant: Samsung Electronics Co., Ltd., Gyeonggi-do (KR)

(72) Inventors: Satyajit Anand, Patna (IN); Sreenath Dindukurthi, Bengaluru (IN); Amit Arvind Mankikar, Bengaluru (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/750,759

(22) Filed: Jan. 23, 2020

(65) Prior Publication Data

US 2020/0367043 A1    Nov. 19, 2020

(30) Foreign Application Priority Data

Jan. 24, 2019   (IN) .................. 201941002922 PS
Jan. 3, 2020    (IN) .................. 201941002922 CS

(51) Int. Cl.
*H04W 8/02*       (2009.01)
*H04W 76/10*      (2018.01)
(Continued)

(52) U.S. Cl.
CPC ............ *H04W 8/02* (2013.01); *H04W 8/183* (2013.01); *H04W 12/06* (2013.01); *H04W 76/10* (2018.02)

(58) Field of Classification Search
CPC ... H04W 72/042; H04W 12/06; H04W 48/18; H04W 8/12; H04W 12/08; H04W 8/06; H04W 36/14; H04W 76/10; H04W 12/0023; H04W 48/20; H04W 8/02; H04W 12/00514; H04W 8/24; H04W 92/02
See application file for complete search history.

(56) References Cited

U.S. PATENT DOCUMENTS 9,451,098 B2   9/2016  Zhu et al.
9,609,516 B2   3/2017  Golaup et al.
(Continued)

FOREIGN PATENT DOCUMENTS

WO   WO 2014/062384   4/2014
WO   WO 2016/161166   10/2016

OTHER PUBLICATIONS

International Search Report dated May 8, 2020 issued in counterpart application No. PCT/KR2020/001200, 9 pages.

*Primary Examiner* — Kwasi Karikari
(74) *Attorney, Agent, or Firm* — The Farrell Law Firm, P.C.

(57) ABSTRACT

A method of a roaming subscription at a device is provided. The method includes receiving a roaming subscription request comprising a roaming location of a user, transmitting, to a first server, home mobile network operator (MNO) information comprising at least one of a mobile country code (MCC) or a mobile network code (MNC), retrieving home MNO data from the first server based on the home MNO information, requesting an authentication credential to a home MNO based on the home MNO data, transmitting the authentication credential to a roaming MNO, receiving, from the home MNO, a link to the roaming MNO, and establishing a connection to the roaming MNO based on the link to the roaming MNO to initiate a network service at the roaming location.

20 Claims, 6 Drawing Sheets

(51) Int. Cl.
*H04W 8/18* (2009.01)
*H04W 12/06* (2021.01)

(56) References Cited

U.S. PATENT DOCUMENTS

| | | |
|---|---|---|
| 2013/0102306 A1 | 4/2013 | Sachanandani |
| 2015/0257122 A1 | 9/2015 | Sen et al. |
| 2015/0319603 A1* | 11/2015 | Faller .................... H04W 12/06 455/432.1 |
| 2015/0334552 A1* | 11/2015 | Li ........................... H04W 8/02 370/329 |
| 2016/0295544 A1 | 10/2016 | Jiang et al. |
| 2018/0109676 A1 | 4/2018 | Yeoum et al. |
| 2018/0110081 A1* | 4/2018 | Serna .................. H04L 65/1069 |
| 2018/0255449 A1 | 9/2018 | Gonzalez et al. |
| 2018/0337921 A1* | 11/2018 | Wang .................. H04L 63/0876 |

* cited by examiner

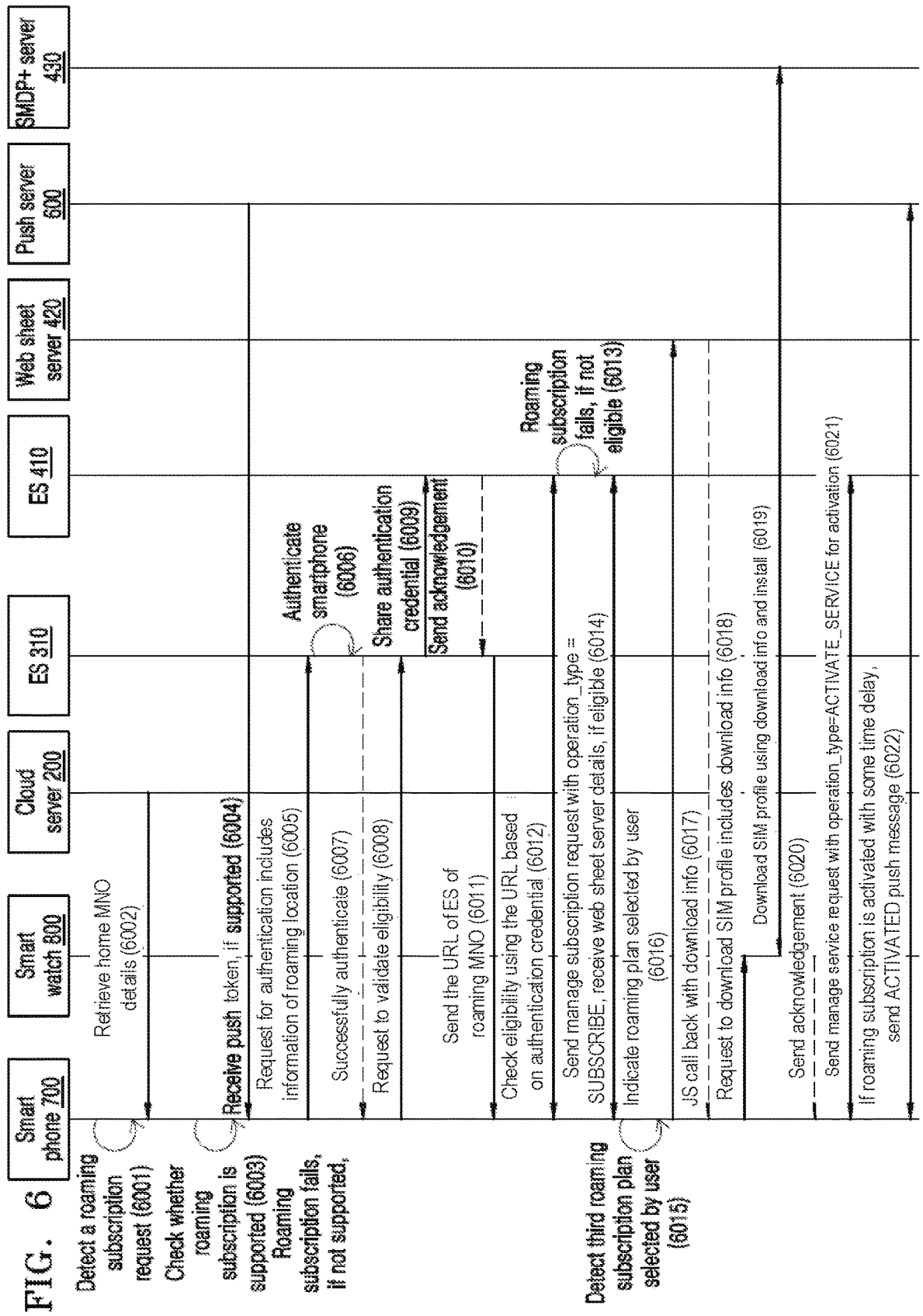

METHOD AND APPARATUS FOR ROAMING SUBSCRIPTION WITH EMBEDDED SUBSCRIBER IDENTITY MODULE

CROSS-REFERENCE TO RELATED APPLICATION(S)

This application is based on and claims priority under 35 U.S.C. § 119(a) of an Indian Provisional Patent Application Number 201941002922 (PS) filed on Jan. 24, 2019 and an Indian Complete Patent Application Number 201941002922 (CS), filed on Jan. 3, 2020, in the Indian Intellectual Property Office, the entire disclosures of which are incorporated herein by reference.

BACKGROUND

1. Field

The disclosure relates generally to electronic devices. In particular, the disclosure relates to a method and an apparatus for a roaming subscription with an embedded subscriber identity module (eSIM).

2. Description of Related Art

An eSIM is a new generation universal integrated circuit card (UICC) which is called an embedded UICC (eUICC) that is assembled into an electronic device during manufacturing. On-device activation (ODA) is a preferred way for remote SIM provisioning (RSP) for remotely downloading a subscriber identity module (SIM) profile to the eSIM and activating a subscription with a mobile network operator (MNO). The SIM profile includes information about the MNO and subscriber data. The electronic device may download multiple SIM profiles from a single MNO to activate different subscriptions provided by the MNO. For example, the electronic device subscribes to a home MNO and when the user is away from the home MNO (i.e., home country) and is located in a country where a roaming MNO is available, the user wishes to promptly use services with the roaming MNO to initiate data transmission or voice calls during his or her stay abroad. It will be convenient for a user of the electronic device if the user were be able to access data service using the ODA for the roaming MNO with the home MNO.

It may be convenient for a user of the electronic device if the user may be able to access data service using the ODA for the roaming MNO with the home MNO. It will be convenient for the user if the user can activate an international roaming service over an existing subscription with the home MNO during his or her stay abroad where the usage of the international roaming service over existing subscription is very expensive with respect to the subscription provided by a roaming MNO. Alternatively, the user needs to provision the subscription with the roaming MNO independently to initiate the data transaction or the voice calls during the abroad visits. Provisioning the subscription with the roaming MNO requires a manual effort for authenticating the electronic device at the roaming MNO and checking an eligibility of the electronic device and/or the user to access services providing by the roaming MNO.

SUMMARY

The disclosure has been made to address at least the disadvantages described above and to provide at least the advantages described below.

In accordance with an aspect of the disclosure, a method of a roaming subscription at a device is provided. The method includes receiving a roaming subscription request comprising a roaming location of a user, transmitting, to a first server, home MNO information comprising at least one of a mobile country code (MCC) or a mobile network code (MNC), retrieving home MNO data from the first server based on the home MNO information, requesting an authentication credential to a home MNO based on the home MNO data, transmitting the authentication credential to a roaming MNO, receiving, from the home MNO, a link to the roaming MNO, and establishing a connection to the roaming MNO based on the link to the roaming MNO to initiate a network service at the roaming location.

In accordance with an aspect of the disclosure, an apparatus for a roaming subscription with an eSIM is provided. The apparatus includes a global positioning system (GPS) sensor, a processor configured to receive a roaming subscription request comprising a roaming location of a user determined by the GPS sensor, transmit, to a first server, home MNO information comprising at least one of an MCC or an MNC, retrieve home MNO data from the first server based on the home MNO information, request an authentication credential to a home MNO based on the home MNO data, transmit the authentication credential to a roaming MNO, receiving, from the home MNO, a link to the roaming MNO, and establish a connection to the roaming MNO based on the link to the roaming MNO to initiate a network service at the roaming location, and a memory configured to store the home MNO information, the home MNO data, and the authentication credential.

In accordance with an aspect of the disclosure, a non-transitory computer readable medium embodying a computer program for operating an electronic device including a memory and a processor is provided. The computer program includes computer readable instructions that, when executed by the processor, causes the electronic device to receive a roaming subscription request comprising a roaming location of a user determined by a GPS sensor, transmit, to a first server, home MNO information comprising at least one of an MCC or an MNC, retrieve home MNO data from the first server based on the home MNO information, request an authentication credential to a home MNO based on the home MNO data, transmit the authentication credential to a roaming MNO, receive, from the home MNO, a link to the roaming MNO, and establish a connection to the roaming MNO based on the link to the roaming MNO to initiate a network service at the roaming location.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 6 is a diagram of activating a roaming subscription for the secondary electronic device by the roaming MNO, according to an embodiment.

DETAILED DESCRIPTION

Figure 1:
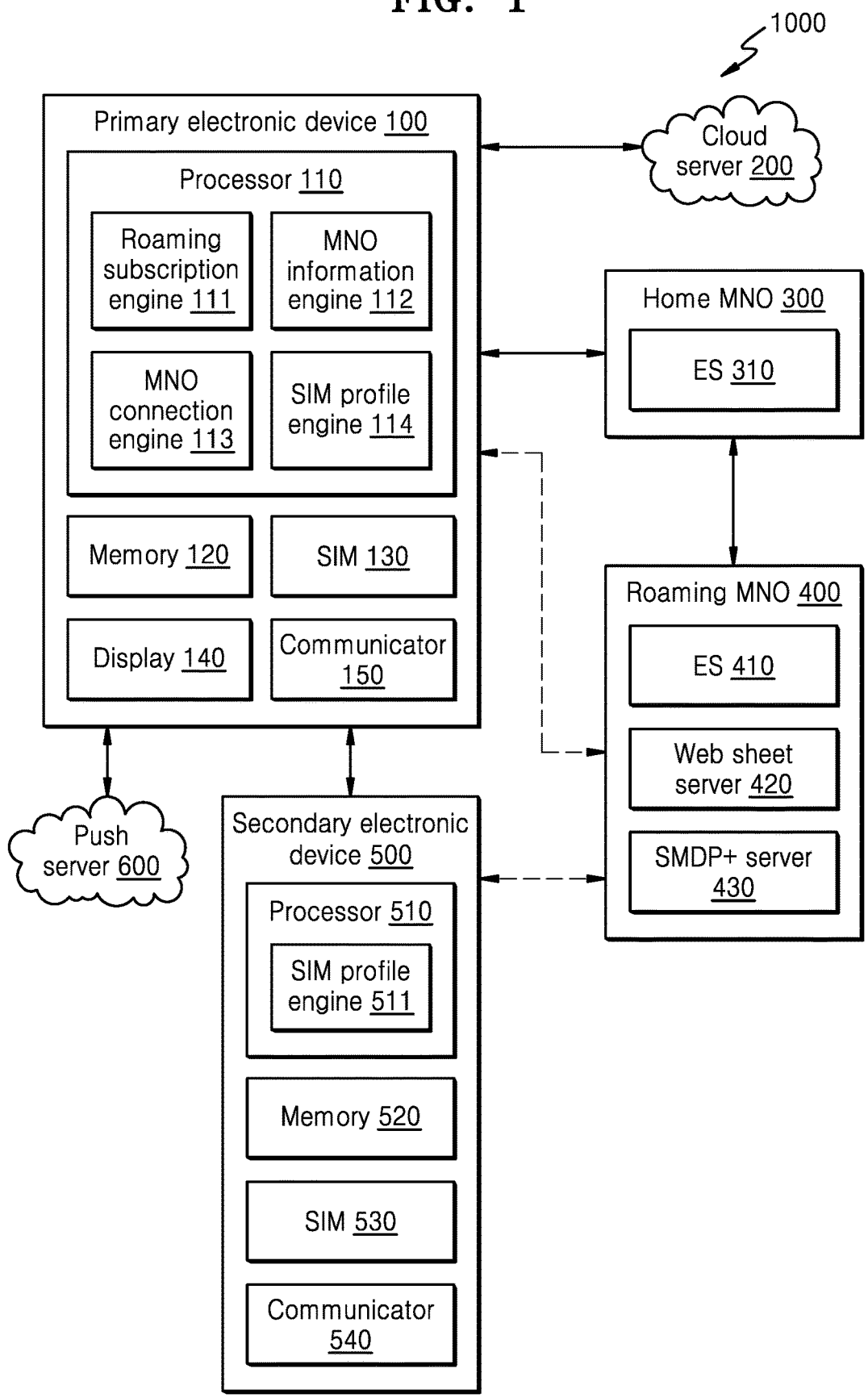
FIG. 1 is a diagram of a system for providing a roaming subscription through a home based MNO, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) devices, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Accordingly, the embodiments herein provide a method for providing a roaming subscription through a home based MNO subscription. The method includes receiving, by a primary electronic device, a roaming subscription request including a roaming location of a user and a user preference. The method includes fetching, by the primary electronic device, information of a home MNO of a SIM of the primary electronic device. The method includes connecting, by the primary electronic device, with a roaming MNO based on the information of the home MNO. The method includes configuring, by the primary electronic device, the roaming subscription with the roaming MNO.

The home MNO may share authentication credentials of the primary electronic device with the roaming MNO. Therefore, the roaming MNO provides roaming subscription plans to the primary electronic device in response to receiving the roaming subscription request. The primary electronic device may download SIM profiles from the roaming MNO and store at the eUICC. The primary electronic device may initiate a roaming subscription plan with an existing SIM profile in the primary electronic device based on the roaming subscription plan selected by the user. Therefore, the primary electronic device can use a data service such as voice calls at the roaming location through the roaming MNO without authenticating the primary electronic device with the roaming MNO and checking an eligibility of the primary electronic device for accessing services provided by the roaming MNO. Hence, the method improves a user experience in accessing data services provided by the roaming MNO with low effort and low cost. In particular, since the roaming service can be initiated without replacing the SIM installed at the primary electronic device with a local SIM at the roaming location, it is convenient for the user to access data services with low cost.

FIG. 1 is a diagram of a system for providing a roaming subscription through a home based MNO, according to an embodiment.

Referring to FIG. 1, the system 1000 includes a primary electronic device 100, a cloud server 200, a home MNO 300, and a roaming MNO 400.

The system 1000 includes the primary electronic device 100, the cloud server 200, the home MNO 300, the roaming MNO 400, a secondary electronic device 500 and a push server 600. The primary electronic device 100 may be connected to the cloud server 200, the home MNO 300, the secondary electronic device 500 and/or the push server 600. The home MNO 300 is connected to the roaming MNO 400 and establishes a mutual collaboration agreement with the roaming MNO 400 to share resources each other. The cloud server 200 stores information of the MNOs, such as an entitlement server (ES) address included in the MNOs, capabilities of MNOs for each roaming locations based on a mobile country code and mobile network code values. The home MNO 300 may include the ES 310. The roaming MNO 400 may include an ES 410, a web sheet server 420 and a subscription manager data preparation plus (SMDP+) server 430. The ES 410, the web sheet server 420 and the SMDP+ server 430 may be combined to one server.

The primary electronic device 100 may include a processor 110, a memory 120, a SIM 130, a display 140 and a communicator 150. The processor 110 may include a roaming subscription engine 111, an MNO information engine 112, an MNO connection engine 113 and a SIM profile engine 114. The processor 110 may be configured to execute instructions stored in the memory 120. The memory 120 may include non-volatile storage and/or volatile storage. Examples of such non-volatile storage may include magnetic hard discs, optical discs, floppy discs, flash memories, an electrically programmable memory (EPROM) or an electrically erasable and programmable memory (EEPROM).

The SIM 130 is one of an installed SIM and an eSIM. A SIM profile of the home MNO 300 is stored at the SIM 130. The display 140 displays user interfaces for receiving user inputs and user selections. The display 140 may be a touch display. Examples for the display 140 include one of, but not limited to, a liquid crystal display, a light emitting diode display, etc.

The communicator 150 is configured to communicate internally between hardware components in the primary electronic device 100. Further, the communicator 150 is configured to facilitate the communication between the primary electronic device 100 and other devices outside the primary electronic device 100 (i.e., the cloud server 200, the home MNO 300, the roaming MNO 400, the secondary electronic device 500 and the push server 600).

The secondary electronic device 500 may include a processor 510, a memory 520, a SIM 530 and a communicator 540. The processor 510 may include a SIM profile engine 511. The processor 510 is configured to execute instructions stored in the memory 520. The memory 520 may include non-volatile storage elements.

The SIM 530 is one of the installed SIM and the eSIM. The communicator 540 is configured to communicate internally between hardware components in the secondary electronic device 500. Further, the communicator 540 is configured to facilitate the communication between the secondary electronic device 500 and the other devices outside the second electronic device 500 (i.e. the primary electronic device 100 and the roaming MNO 400).

The primary electronic device 100 is configured to receive a roaming subscription request from a user. The roaming subscription engine 111 receives the roaming subscription request from the user. The roaming subscription request includes at least one of a roaming location of the user and a user preference. The roaming subscription engine 111 receives information on the roaming location based on at least one of a user input and GPS of the primary electronic device 100. The user preference indicates a user selection of a shared number service or a different number service available in the primary electronic device 100. The user preference indicates a preferred electronic device to enable roaming subscription. The primary electronic device 100 allows the user to select either the primary electronic device 100 or the secondary electronic device 500 as the preferred electronic device to initiate the roaming subscription.

The primary electronic device 100 may fetch or retrieve the home MNO information of the SIM 130 installed at the primary electronic device 100. The MNO information engine 112 fetches the home MNO information of the SIM 130 installed at the primary electronic device 100. The SIM 130 is one of an installed SIM and an eSIM. The SIM 130 includes a SIM profile of the home MNO 300 corresponding to an existing subscription of the primary electronic device 100 to the home MNO 300. The home MNO information may include an MCC and/or an MNC. The home MNO information may include an authentication method payload request data. The MCC may consist of three decimal digits (e.g., "001") and the MNC may consist of two or three decimal digits (e.g., "01"). The MCC and MNC combination may be used to uniquely identify a mobile network carrier using the global system for mobile communications (GSM), the universal mobile telecommunication system (UMTS), the long term evolution (LTE) and $5^{th}$ Generation (5G) public land mobile network.

The primary electronic device 100 may connect to the roaming MNO 400 based on the home MNO information of the home MNO 300. The MNO connection engine 113 may connect to the ES 410 of the roaming MNO 400 based on the home MNO information.

The primary electronic device 100 may transmit the home MNO information to the cloud server 200. The MNO information engine 112 may forward the home MNO information to the cloud server 200. Further, the primary electronic device 100 may retrieve home MNO detailed data from the cloud server 200. The term "home MNO detailed data" may be used interchangeably with "home MNO data" in the disclosure. The MNO information engine 112 may retrieve the home MNO detailed data from the cloud server 200. The home MNO detailed data includes an address of the ES 310 of the home MNO 300 and capability information of the home MNO 300. The capability information of the home MNO 300 may further include entitlement information of the home MNO 300. Examples of the capability information are capability information on ODA remote SIM provisioning, offline remote SIM provisioning, QR remote SIM provisioning, ODA-roaming support etc. Examples for the entitlement information are at least one of the ES address, the operator's remote SIM provisioning platform address, etc. Based on the home MNO detailed data, the primary electronic device 100 may connect to the roaming MNO 400.

The roaming subscription engine 111 determines whether the home MNO 300 has the capability to perform the ODA in the roaming location based on the capability information of the home MNO 300. The roaming subscription engine 111 discontinues the ODA for the roaming subscription, when the home MNO 300 does not has the capability to perform the ODA in the roaming location. The roaming subscription engine 111 requests to the push server 600 for generating a push token for the primary electronic device 100, when the home MNO 300 has the capability to perform the ODA in the roaming location. A push event data includes at least one of a push action notification, a push token notification and a push event notification.

The push action notification indicates registering or deregistering at firebase cloud messaging/google cloud messaging (FCM/GCM). The push token notification indicates the push token generated using a certain push type. In an example, the push event notification indicates AGREEMENT_COMPLETED=0, PLAN_SELECTION_COMPLETED=1, SERVICE_ACTIVATED=2, SERVICE_DEACTIVAED=3, CONFIG_CHANGED=4, SUBSCRIPTION_UNSUBSCRIBED=5, SUBSCRIPTION_EXPIRED=6, ELIGIBILITY_CHANGED=7, GUIDE_TO_SUBSCRIPTION=8. The push server 600 generates the push token and sends to the MNO connection engine 113. Further, the MNO connection engine 113 receives the push token from the push server 600 and requests to the home MNO 300 to authenticate the primary electronic device 100 based on the push token.

The home MNO 300 authenticates the primary electronic device 100. The ES 310 authenticates the primary electronic device 100 based on primary electronic device information. Examples of the authentication methods used by the ES 310 are, but not limited to, an extensible authentication protocol-authentication and key agreement (EAP-AKA) authentication method, an open ID connect (OIC) authentication method, a short messaging service-one time password (SMS-OTP) authentication method, a cellular network based (CNB) authentication method, an internet protocol (IP) authentication method, etc.

The primary electronic device information includes at least one of an identification (ID) of the primary electronic device 100 (e.g., an international mobile equipment identity number), a manufacturer of the primary electronic device 100, a model name of the primary electronic device 100, a version of a software installed at the primary electronic device 100, an eUICC ID of the secondary electronic device 500, and an ICCID of the secondary electronic device 500.

The MNO connection engine 113 sends a request to the ES 310 for validating an eligibility of at least one of the primary electronic device 100, secondary electronic device 500 and the user for the roaming subscription. The request may include information on roaming location of the user. The ES 310 validates the eligibility of at least one of the primary electronic device 100, secondary electronic device 500, and the user for the roaming subscription. The eligibility may be validated based on a know your customer (KYC) status, validity of supporting documents for providing the subscription, cellular specifications supporting by the primary electronic device 100 and the secondary electronic device 500, etc.

The home MNO 300 shares an authentication credential with the roaming MNO 400. The ES 310 of the home MNO 300 shares the authentication credential with the ES 410 of the roaming MNO 400, in response to a successful validation of at least one of the primary electronic device 100, secondary electronic device 500, and the user for the roaming subscription. The authentication credential includes the primary electronic device information, user details, an authentication token to be used by the primary electronic device 100 to interact with the roaming MNO 400. The home MNO 300 may share a uniform resource locator (URL) and the authentication credential with the primary electronic device 100.

The ES 310 shares the URL and the authentication credential with the MNO connection engine 113. The URL redirects the primary electronic device 100 to the roaming MNO 400. The URL includes an address of the ES 410 of the roaming MNO 400. The roaming MNO 400 may be located at the roaming location or may be available for providing a data network service at the roaming location. The primary electronic device 100 may establish a connection to the roaming MNO 400 using the URL based on the authentication credential. The MNO connection engine 113 establishes the connection with the ES 410 based on the URL and the authentication credential. The MNO connection engine 113 establishes the connection with the ES 410 by sending a manage subscription request to the ES 410. The primary electronic device 100 may be able to use or initiate a network service at the roaming location based on the establishment of the connection to the roaming MNO 400.

The MNO connection engine 113 connects to the ES 410 using the URL and shares the authentication credential with the ES 410. The ES 410 determines whether the authentication credential received from the MNO connection engine 113 matches the authentication credential obtained from the ES 310. Further, the ES 410 allows the MNO connection engine 113 to continue the connection if the matching is successful. The primary electronic device 100 may discontinue or stop the ODA for the roaming subscription, when the matching is not successful at the ES 410. In response to a successful matching of the authentication credentials at ES 410, the MNO connection engine 113 fetches a URL of the web sheet server 420 from the ES 410, where the URL includes an address of the web sheet server 420. Further, the MNO connection engine 113 connects to the web sheet server 420 based on the URL of the web sheet server 420 obtained from the ES 410.

The primary electronic device 100 configures and initiates the roaming subscription with the roaming MNO 400. The MNO connection engine 113 configures the roaming subscription with the roaming MNO 400. The roaming MNO 400 provides a list of roaming subscription plans over the web sheet server 420 to the primary electronic device 100 for the roaming subscription. The web sheet server 420 provides the list of roaming subscription plans to the MNO connection engine 113 for configuring the roaming subscription. The list of roaming subscription plans are provided based on the tie-up relation between the home MNO 300 and the roaming MNO 400.

Data provided by web sheet server 420 includes subscription service URL, subscription service user data, subscription service contents type, companion configurations. The subscription service URL data includes web page address for subscription managing procedure. The subscription service user data includes parameters for access subscription service URL and user data associated with a hypertext transfer protocol (HTTP) web request towards a subscription web view. The subscription service contents type includes acceptable web sheet request method and body type for the subscription. The companion configurations include array of secondary electronic device IDs that grouped into one number service mapped with the primary electronic device 100.

The display 140 may display the list of roaming subscription plans to the user. The MNO connection engine 113 detects the roaming subscription plan selected by the user, in response to receiving the user selection of at least one of the roaming subscription plans from the list of roaming subscription plans. Further, the MNO connection engine 113 may transmit the roaming subscription plan selected by the user to the web sheet server 420.

The roaming MNO 400 detects the roaming subscription plan selected by the user from the list of roaming subscription plans. The web sheet server 420 detects the roaming subscription plan selected by the user from the list of roaming subscription plans.

The roaming MNO 400 sends a download information of a SIM profile of the roaming MNO 400 to the primary electronic device 100 based on the roaming subscription plan selected by the user. In an embodiment, the web sheet server 420 sends the download information of the SIM profile of the roaming MNO 400 to the MNO connection engine 113 based on the roaming subscription plan selected by the user. The web sheet server 420 sends a java script (JS) callback with the download information of the SIM profile of the roaming MNO 400 to the MNO connection engine 113. The download information includes an SMDP+ address of the SMDP+ server 430, a SIM profile ICCID and an activation code.

The primary electronic device 100 downloads the SIM profile from the roaming MNO 400 based on the download information and the user preference. The SIM profile engine 114 downloads the SIM profile from the roaming MNO 400 based on the download information and the user preference. The SIM profile engine 114 provides the roaming subscription to a new international subscriber directory number (i.e., a mobile station international subscriber directory number (MSISDN)) of the roaming MNO 400, when the different number service is selected by the user. The SIM profile engine 114 downloads the SIM profile from the SMDP+ server 430 to the SIM 130 based on the download information, when the different number service is selected by the user and the preferred electronic device is the primary electronic device 100. Further, the SIM profile engine 114 deactivates the existing SIM profile of the home MNO 300 at the SIM 130 and activates the SIM profile downloaded from the roaming MNO 400. The primary electronic device 100 includes more than one SIM 130, such as a first SIM and a second SIM (not shown). The SIM profile engine 114 downloads the SIM profile from the SMDP+ server 430 to the second SIM 130, when the existing SIM profile of the home MNO 300 is enabled at the first SIM.

The primary electronic device 100 is configured to activate the roaming subscription over the home based MNO subscription based on the download information and the user preference. The SIM profile engine 114 activates the roaming subscription over the home based MNO subscription based on the download information and the user preference. The SIM profile engine 114 activates the roaming subscription corresponding to the SIM profile in the SMDP+ server 430 over the home based MNO subscription based on the download information, when the shared number service is selected by the user and the preferred electronic device is the primary electronic device 100. The roaming subscription is provided over an existing MSISDN of the SIM 130 of the home MNO 300, when the shared number service is selected by the user.

The primary electronic device 100 is configured to send the download information and the user preference to the secondary electronic device 500. Further, the secondary electronic device 500 may download the SIM profile from the roaming MNO 400 based on the download information and the user preference. The SIM profile engine 114 sends the download information and the user preference to the SIM profile engine 511 of the second electronic device 500, when the preferred electronic device is the secondary electronic device 500. the SIM profile engine 511 may download the SIM profile from the SMDP+ server 430 and store the SIM profile at the SIM 530 based on the download information, when the different number service is selected. Further, the SIM profile engine 511 may activate the SIM profile downloaded from the roaming MNO 400.

The SIM profile engine 511 may deactivate the existing SIM profile of the home MNO 300 stored at the SIM 530 to activate the SIM profile downloaded from the roaming MNO 400. The secondary electronic device 500 includes more than one SIM 530, such as the first SIM and the second SIM. The SIM profile engine 511 downloads the SIM profile from the SMDP+ server 430 to the second SIM, when the existing SIM profile of the home MNO 300 is activated at the first SIM. The SIM profile engine 511 may provide a response to the primary electronic device 100, in response to downloading the SIM profile to the SIM 530 or activating the roaming subscription at the SIM 530.

The MNO connection engine 113 send a request to the ES 410 to activate the roaming subscription, in response to downloading the SIM profile or activating the roaming subscription. A manage service request may be an example of the request. The ES 410 may activate the roaming subscription corresponding to the SIM profile downloaded from the SMDP+ server 430. Further, the ES 410 may send an activated response to the primary electronic device 100 for indicating the activation of the roaming subscription. The ES 410 sends an activation message to the primary electronic device 100 through a FCM push message for indicating the activation of the roaming subscription.

Although the FIG. 1 shows the hardware components of the system 1000 but it is to be understood that other embodiments are not limited thereto. The system 1000 may include less or more number of components. Further, the labels or names of the components are used only for illustrative purpose and does not limit the scope of the invention. One or more components can be combined together to perform same or substantially similar function for providing the roaming subscription through the home based MNO subscription.

Figure 2:
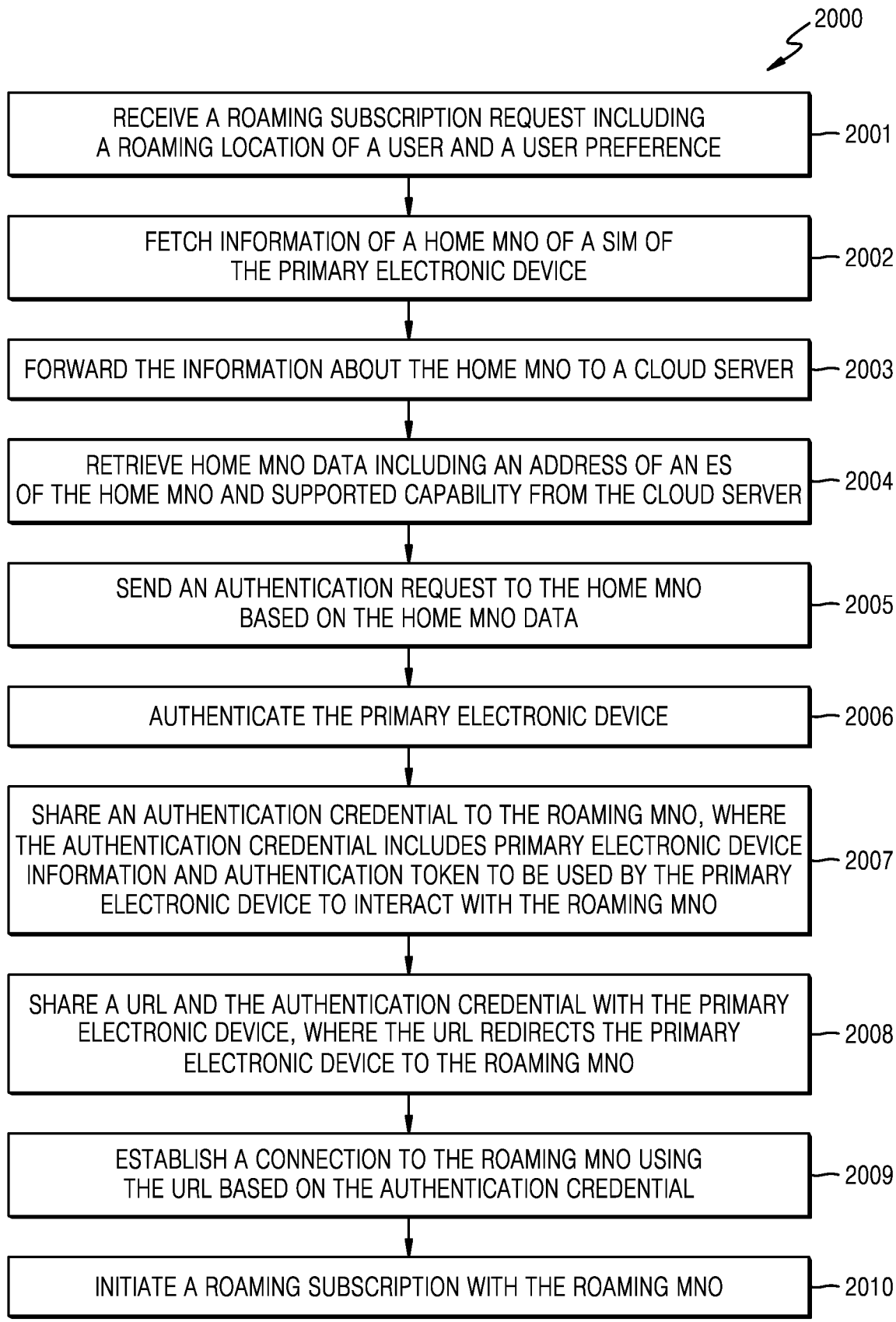
FIG. 2 is a flowchart of a method for providing the roaming subscription through a home based MNO, according to an embodiment.

FIG. 2 is a flowchart 2000 of a method for providing the roaming subscription through a home based MNO, according to an embodiment.

At step 2001, the primary electronic device 100 may receive the roaming subscription request including the roaming location of the user and the user preference. The processor 110 receives the roaming subscription request including the roaming location of the user and/or the user preference. At step 2002, the processor 110 fetches home MNO information of the SIM of the primary electronic device 100. At step 2003, the processor 110 transmits the home MNO information to a cloud server 200.

At step 2004, the processor retrieves the home MNO data which includes the address of the ES 310 of the home MNO 300 and the supported capability from the cloud server 200. At step 2005, the processor 110 transmits a request of authentication credentials to the home MNO 300 based on the home MNO data. At step 2006, the processor 110 authenticates the primary electronic device 100. The ES 310 may authenticate the primary electronic device 100.

At step 2007, the processor 110 may share or transmit the authentication credential to the roaming MNO 400. The authentication credential may include the primary electronic device information and the authentication token to be used by the primary electronic device 100 to interact with the roaming MNO 400. At step 2008, the processor 110 may receive the URL and the authentication credential, where the URL redirects the primary electronic device 100 to the roaming MNO 400.

The ES 310 may share the URL and the authentication credential with the primary electronic device 100, where the URL redirects the primary electronic device 100 to the roaming MNO 400. At step 2009, the method includes establishing the connection to the roaming MNO 300 using the URL based on the authentication credential. At step 2010, the processor 110 may configure or initiate the roaming subscription with the roaming MNO 400.

The various actions, acts, blocks, steps, or the like in the flow diagram 2000 may be performed in the order presented, in a different order or simultaneously. Further, in some embodiments, some of the actions, acts, blocks, steps, or the like may be omitted, added, modified, skipped, or the like without departing from the scope of the invention.

Figure 3:
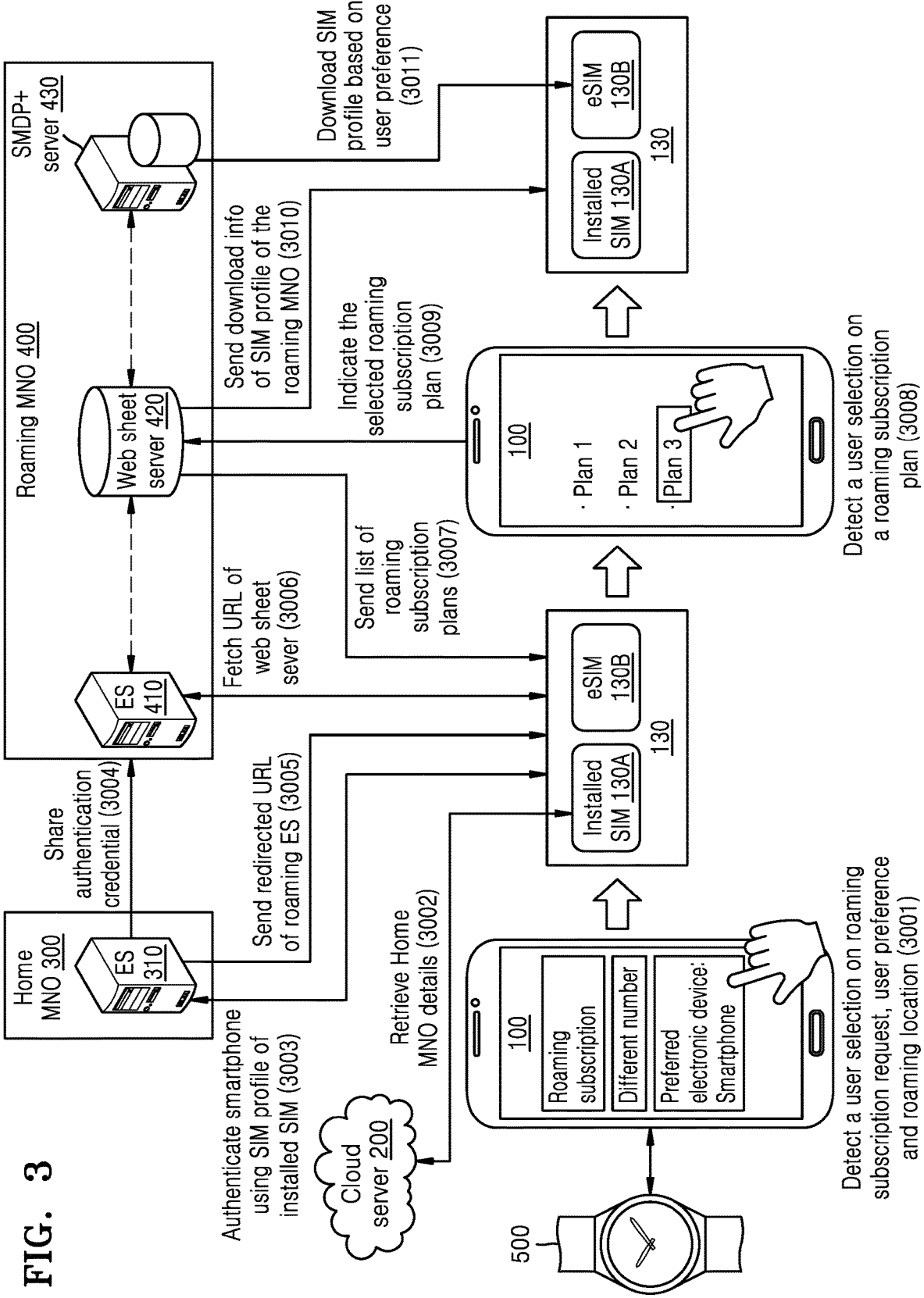
FIG. 3 is a diagram of an example scenario of activating the roaming subscription with an eSIM by a roaming MNO, according to an embodiment.

FIG. 3 is a diagram of an example scenario of activating the roaming subscription with an eSIM by a roaming MNO, according to an embodiment.

Referring to FIG. 3, a smartphone may operate as the primary electronic device 100 and a smart watch as the secondary electronic device 500. The primary electronic device includes a GPS sensor (not shown), the installed SIM 130A and the eSIM 130B, where the SIM profile of the home MNO 300 is installed in the installed SIM 130A. The secondary electronic device 500 includes the eSIM as the SIM 530 of the secondary electronic device 500. The smartphone as the primary electronic device 100 is connected to the smart watch as the secondary electronic device 500, the cloud server 200 and the home MNO 300.

The user is located in the roaming location. The user initiates a roaming subscription request at the smartphone (i.e., the primary electronic device 100) by proving the user preference. The user may select the different number service as one of the user preference. Further, the user selects the primary electronic device 100 as the preferred electronic device as another user preference. The primary electronic device 100 detects at step 3001 the roaming subscription request and the user preference. Further, the primary electronic device 100 detects the information about the roaming location based on the GPS coordinates obtained from the GPS sensor of the primary electronic device 100.

The primary electronic device 100 fetches the home MNO information of the installed SIM 130A. At step 3002, the primary electronic device 100 retrieves home MNO data from the cloud server 200 using the home MNO information of the home MNO 300. The primary electronic device 100 sends a request to the home MNO 300 to authenticate the primary electronic device 100 based on the home MNO data, where the request may include the information about the roaming location. The ES 310 determines whether the roaming MNO 400 is available in the roaming location with which the home MNO 300 has the tie-up relationship, in response to receiving the request. Further, the ES 310 determines the URL of the ES 410 of the roaming MNO 400. At step 3003, the ES 310 authenticates the primary electronic device 100 using the SIM profile stored in the installed SIM 130A and generates the authentication credential. At step 3004, the ES 310 shares the authentication credential with the roaming MNO 400. The ES 410 receives the authentication credential. At step 3005, the ES 310 sends the URL of the ES 410 to the primary electronic device 100.

The primary electronic device 100 establishes a connection to the ES 410 using the URL and provides the authentication credential to the ES 410. The ES 410 validates the connection by matching the authentication credentials received at the ES 410. In response to a successful matching of the authentication credentials, the ES 410 proceeds to establish a connection to the primary electronic device 100. At step 3006, the primary electronic device 100 fetches the URL of the web sheet server 420 from the ES 410. The primary electronic device 100 requests to the web sheet server 420 for the list of roaming subscription plans using the URL of the web sheet server 420. At step 3007, the web sheet server 420 sends the list of roaming subscription plans available in the roaming MNO 400 as per the tie-up relationship to the primary electronic device 100. The primary electronic device 100 displays the list of roaming subscription plans to the user.

It may be assumed that the user selects a third roaming subscription plan in the list of roaming subscription plans. At step 3008, the primary electronic device 100 detects the user selection of the third roaming subscription plan. At step 3009, the primary electronic device 100 transmits to the web sheet server 420 the user selection of the third roaming subscription plan. The web sheet server 420 determines the SIM profile in the roaming MNO 400 corresponding to the third roaming subscription plan. At step 3010, the web sheet server 420 sends the download information of the SIM profile in the roaming MNO 400 to the primary electronic device 100. The primary electronic device 100 connects to the SMDP+ server 430 of the roaming MNO 400 using the SMDP address included in the download information. At step 3011, the smartphone 100 downloads the SIM profile from the SMDP+ server 430 to the eSIM 130B of the primary electronic device 100 using the download information. The primary electronic device 100 requests to the ES 410 to activate the roaming subscription with the roaming MNO 400. Further, the ES 410 activates the roaming subscription for the primary electronic device 100 and sends an acknowledgement to the smartphone 100.

Figure 4:
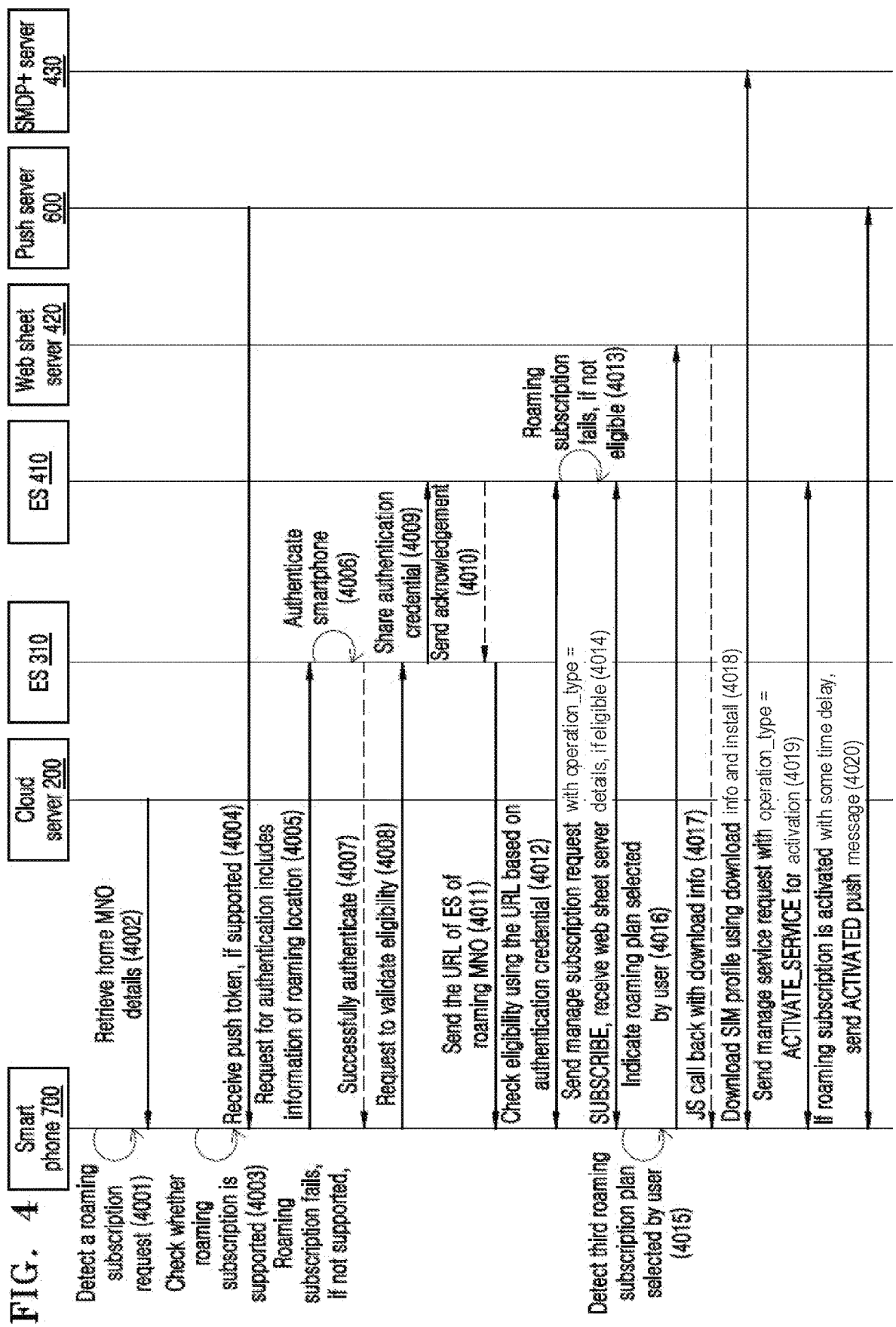
FIG. 4 is a diagram of activating a roaming subscription with an eSIM, according to an embodiment.

FIG. 4 is a diagram of activating a roaming subscription with an eSIM, according to an embodiment.

It is assumed that a user is present in the roaming location. The user initiates the roaming subscription request at the smartphone 700 as the primary electronic device 100 by proving the user preference. At step 4001, the smartphone 700 detects the roaming subscription request initiated by the user. At step 4002, the smartphone 700 retrieves home MNO data from the cloud server 200 using the information of the home MNO 300 (i.e., the home MNO information). At step 4003, the smartphone 700 determines whether the home MNO 300 has the capability of performing the ODA in the roaming location based on the supported capability.

The smartphone 700 deactivates the ODA for the roaming subscription, when the home MNO 300 does not have the capability of performing the ODA in the roaming location. At step 4004, the smartphone 700 receives the push token from the push server 600 by requesting to the push server 600, when the home MNO 300 has the capability of performing the ODA in the roaming location. At step 4005, the smartphone 700 requests to the ES 310 to authenticate the smartphone 700 based on the home MNO data, where the request includes the information about the roaming location. The ES 310 determines the URL of the ES 410 of the roaming MNO 400, in response to receiving the request which includes the information about the roaming location. At step 4006, the ES 310 authenticates the smartphone 700 using the SIM profile stored in the installed SIM 130A of the smartphone 700 and generates the authentication credential. The authentication credential may include, but not limited to, a user ID and a user password. At step 4007, the ES 310 sends an acknowledgement to the smartphone 700 indicating a success of authentication, in response to successful authentication of the smartphone 700.

At step 4008, the smartphone 700 sends, to the ES 310, a request for validating the eligibility of the smartphone 700 and the user for the roaming subscription, where the request may include information about the roaming location. At step 4009, the ES 310 shares the authentication credential with the ES 410, in response to a validation of the eligibility of the smartphone 700 and the user. At step 4010, the ES 410 sends an acknowledgement to the ES 310, in response to receiving the authentication credential. At step 4011, the ES 310 shares the authentication credential and the URL of the ES 410 to the smartphone 700. The smartphone 700 connects to the ES 410 using the URL. At step 4012, the ES 410 checks an eligibility of the smartphone 700 by matching the authentication credential from the smartphone 100 with the authentication credential available at the ES 410. At step 4013, the ES 410 causes the smartphone 700 to deactivate the ODA for the roaming subscription, when the authentication credentials are not matching at the ES 410. At step 4014, the smartphone 700 sends a manage subscription request with operation_type=SUBSCRIBE to ES 410 to obtain a list of roaming subscription plans from the web sheet server 420.

It may be assumed that the user selects the third roaming subscription plan in the list of roaming subscription plans. At step 4015, the smartphone 700 detects the user selection on the third roaming subscription plan. At step 4016, the smartphone 700 transmits to the web sheet server 420 the user selection of the third roaming subscription plan. The web sheet server 420 determines the SIM profile in the roaming MNO 400 corresponding to the third roaming subscription plan. At step 4017, the web sheet server 420 sends a JS callback with the download information of the SIM profile in the roaming MNO 400 to the smartphone 700. The smartphone 700 connects to the SMDP+ server 430 using the SMDP address included in the download information.

At step 4018, the smartphone 700 downloads the SIM profile from the SMDP+ server 430 using the download information and installs the SIM profile to the eSIM 130B of the smartphone 700. Further, the smartphone 100 requests the ES 410 to activate the roaming subscription by sending the manage service request with operation_type=ACTIVATE_SERVICE at step 4019. The ES 410 activates the roaming subscription for the smartphone 700. If the roaming subscription is activated with a time delay, the ES 410 sends an acknowledgement of the activation to the smartphone 700 by sending the ACTIVATED message through the push server 600 at step 4020.

Figure 5:
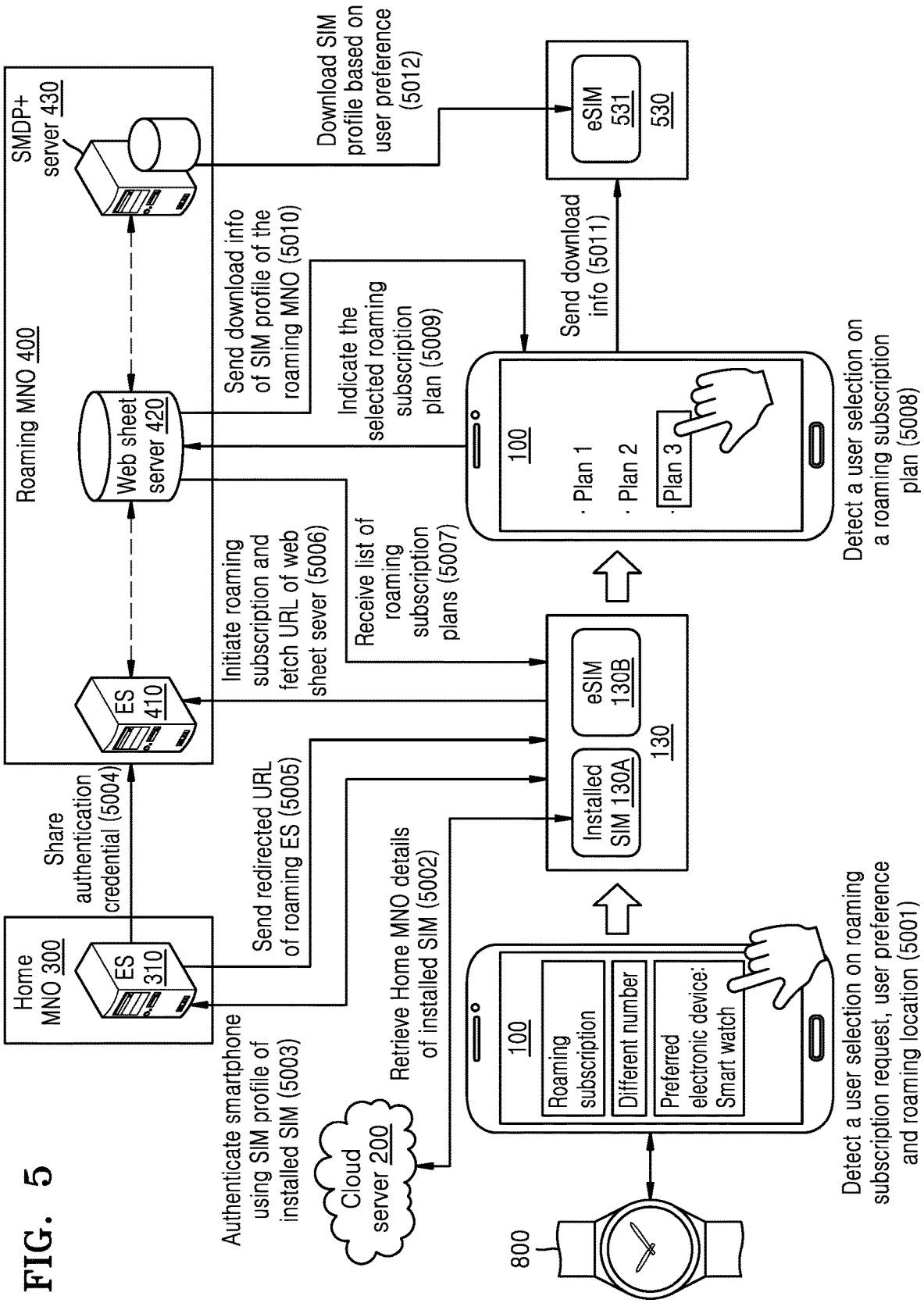
FIG. 5 is a diagram of activating another roaming subscription for a secondary electronic device by the roaming MNO, according to an embodiment.

FIG. 5 is a diagram of activating another roaming subscription for a secondary electronic device by the roaming MNO, according to an embodiment.

It may be assumed that the user is present in the roaming location. The user initiates the roaming subscription request at the primary electronic device 100 by proving the user preference. The user selects the different number service as one of the user preference. Further, the user selects the smart watch 800 as the preferred electronic device. At step 5001, the primary electronic device 100 detects a roaming subscription request with the user preference. The primary electronic device 100 detects the information about the roaming location based on the GPS coordinates obtained from the GPS sensor of the primary electronic device 100. The primary electronic device 100 fetches the information of the home MNO 300 stored in the installed SIM 130A of the primary electronic device 100.

At step 5002, the primary electronic device 100 retrieves home MNO data from the cloud server 200 using the information of the home MNO 300. The primary electronic device 100 requests the home MNO 300 to authenticate the primary electronic device 100 based on the home MNO data, where the request may include the information about the roaming location. The ES 310 of the home MNO 300 determines whether the roaming MNO 400 is available in the roaming location with which the home MNO 300 have the tie-up relationship in response to receiving the request.

Further, the ES 310 detects the URL of the ES 410 of the roaming MNO 400. At step 5003, the ES 310 authenticates the primary electronic device 100 using the SIM profile stored in the installed SIM 130A and generates the authentication credential. At step 5004, the ES 310 shares the authentication credential to the roaming MNO 400. The ES 410 receives the authentication credential.

At step 5005, the ES 310 transmits the authentication credential and the URL of the ES 410 to the primary electronic device 100. The primary electronic device 100 establishes a connection to the ES 410 using the URL and provides the authentication credential to the ES 410. The ES 410 validates the connection by matching the authentication credentials received at the ES 410. In response to a successful matching of the authentication credentials, the ES 410 may proceed to establish the connection to the primary electronic device 100. At step 5006, the primary electronic device 100 fetches the URL of the web sheet server 420 from the ES 410. The primary electronic device 100 requests to the web sheet server 420 for a list of roaming subscription plans using the URL of the web sheet server 420. At step 5007, the web sheet server 420 sends the list of roaming subscription plans available in the roaming MNO 400 as per the tie-up relationship to the primary electronic device 100. The primary electronic device 100 displays the list of roaming subscription plans to the user.

The user may be assumed to select a third roaming subscription plan in the list of roaming subscription plans. At step 5008, the primary electronic device 100 detects the user selection on the third roaming subscription plan. At step 5009, the primary electronic device 100 transmits to the web sheet server 420 the user selection on the third roaming subscription plan. The web sheet server 420 determines the SIM profile in the roaming MNO 400 corresponding to the third roaming subscription plan. At step 5010, the web sheet server 420 sends the download information of the SIM profile in the roaming MNO 400 to the primary electronic device 100. At step 5011, the primary electronic device 100 sends the download information to a wearable device such as the smart watch 800 in FIG. 5. The smart watch 800 may connect to the SMDP+ server 430 using the SMDP address in the download information. At step 5012, the smart watch 800 downloads the SIM profile from the SMDP+ server 430 to the eSIM 531 of the smart watch 800 using the download information. The smart watch 800 may send an acknowledgment to the primary electronic device 100 indicating a successful download of the SIM profile. The primary electronic device 100 requests the ES 410 to activate the roaming subscription with the roaming MNO 400. Further, the ES 410 activates the roaming subscription for the smart watch 800 and sends an acknowledgement to the primary electronic device 100.

FIG. 6 is a diagram of activating a roaming subscription for the secondary electronic device by the roaming MNO, according to an embodiment.

The user initiates a roaming subscription request at the smartphone 700 by providing the user preference. At step 6001, the smartphone 700 detects the roaming subscription request initiated by the user. At step 6002, the smartphone 700 retrieves home MNO details from the cloud server 200 using the information of the home MNO 300 (i.e., home MNO information). At step 6003, the smartphone 700 determines whether the home MNO 300 has the capability of performing an ODA in the roaming location based on the supported capability. The smartphone 700 deactivates the ODA for the roaming subscription when the home MNO 300 does not have the capability of performing the ODA in the roaming location.

At step 6004, the smartphone 700 receives a push token from the push server 600 in response to requesting to the push server 600 when the home MNO 300 has the capability of performing the ODA in the roaming location. At step 6005, the smartphone 700 requests the ES 310 to authenticate the smartphone 700 based on the home MNO details (i.e., home MNO data), where the request may include the information of the roaming location. The ES 310 determines the URL of the ES 410 of the roaming MNO 400 in response to receiving the request including the information of the roaming location. At step 6006, the ES 310 authenticates the smartphone 700 using the SIM profile stored in the installed SIM 130A of the smart phone 700 and generates the authentication credential. At step 6007, the ES 310 sends to the smartphone 700 an acknowledgement indicating the successful authentication in response to the successful authentication of the smartphone 700.

At step 6008, the smartphone 700 sends a request to the ES 310 for validating the eligibility of the smartphone 700, the smart watch 800 and/or the user for the roaming subscription, where the request may include information of roaming location. At step 6009, the ES 310 shares the authentication credential with the ES 410 in response to validating the eligibility of the smartphone 700, the smart watch 800 and/or the user. At step 6010, the ES 410 sends an acknowledgement to the ES 310 in response to receiving the authentication credential. At step 6011, the ES 310 sends the authentication credential and the URL of the ES 410 to the smartphone 700. The smartphone 700 may establish a connection to the ES 410 using the URL. At step 6012, the ES 410 checks the eligibility of the smartphone 700 by matching the authentication credential from the smartphone 700 and the authentication credential available at the ES 410. At step 6013, the ES 410 causes the smartphone 700 to deactivate the ODA for the roaming subscription when the authentication credentials does not match at the ES 410. At step 6014, the smartphone 700 sends a manage subscription request with operation_type=SUBSCRIBE to the ES 410 to obtain a list of roaming subscription plans from the web sheet server 420.

The user may be assumed to select the third roaming subscription plan in the list of roaming subscription plans. At step 6015, the smartphone 700 detects a user selection on the third roaming subscription plan. At step 6016, the smartphone 700 transmits to the web sheet server 420 the user selection on the third roaming subscription plan. The web sheet server 420 determines the SIM profile in the roaming MNO 400 corresponding to the third roaming subscription plan. At step 6017, the web sheet server 420 sends the JS callback with download information of the SIM profile in the roaming MNO 400 to the smartphone 700. At step 6018, the smartphone 700 requests the smart watch 800 to download the SIM profile by sending the download information. The smart watch 800 connects to the SMDP+ server 430 using the SMDP address included in the download information. At step 6019, the smart watch 800 downloads the SIM profile from the SMDP+ server 430 using the download information and installs the SIM profile to the eSIM 531 of the smart watch 800.

At step 6020, the smart watch 800 sends to the smartphone 700 an acknowledgment indicating a successful download of the SIM profile. At step 6021, the smartphone 700 requests the ES 410 to activate the roaming subscription by sending the manage service request with operation_type=ACTIVATE_SERVICE. Further, the ES 410 activates the roaming subscription for the smartphone 700. It may be assumed that the roaming subscription is activated with a time delay. At step 6022, the ES 410 sends the acknowledgement of the activation to the smartphone 700 by sending the ACTIVATED message through the push server 600.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

The method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of a roaming subscription at a device, comprising:
   receiving a roaming subscription request comprising a roaming location of a user;
   transmitting, to a first server, home mobile network operator (MNO) information comprising at least one of a mobile country code (MCC) or a mobile network code (MNC);
   retrieving home MNO data comprising an address of the home MNO from the first server based on the home MNO information;
   requesting, to a home MNO, an authentication credential for a roaming MNO based on the home MNO data;
   transmitting the authentication credential to the roaming MNO;
   receiving, from the home MNO, a link to the roaming MNO; and
   establishing a connection to the roaming MNO based on the link to the roaming MNO to initiate a network service at the roaming location.

2. The method of claim 1, wherein the roaming subscription request further comprises a user preference between a shared number service and a different number service.

3. The method of claim 2, further comprising receiving a selection of one of the shared number service and the different number service for the roaming service.

4. The method of claim 3, wherein the shared number service is provided to the device with a pre-existing mobile station international subscriber directory number (MSISDN) of an existing subscriber identity module (SIM) of the home MNO and the different number service for the roaming service is provided with a new MSISDN of the roaming MNO.

5. The method of claim 4, further comprising:
   downloading, in response to the selection of the different number service, a SIM profile from the roaming MNO.

6. The method of claim 5, further comprising:
   activating the downloaded SIM profile for initiating the network service at the roaming location.

7. The method of claim 1, wherein interacting with the roaming MNO is performed without changing an existing subscriber identity module (SIM) installed at the device.

8. The method of claim 1, further comprising:
   receiving a selection of a roaming subscription plan with an existing SIM of the device; and
   initiating the selected roaming subscription plan.

9. The method of claim 1, wherein the home MNO data further comprises capability information of the home MNO.

10. The method of claim 9, wherein the capability information of the home MNO comprises capability information on on-device-activation (ODA) remote subscriber identity module (SIM) provisioning, capability information on offline remote SIM provisioning, capability information on QR-based remote SIM provisioning, and capability information on ODA roaming support.

11. The method of claim 10, further comprising:
   determining whether the home MNO is capable of performing the ODA in the roaming location of the user based on the capability information of the home MNO.

12. The method of claim 11, further comprising:
   transmitting, to a push server, a request for generating a push token based on determining that the home MNO is capable of performing the ODA in the roaming location of the user.

13. The method of claim 9, wherein the capability information of the home MNO further comprises entitlement information of the home MNO which includes an address of an entitlement server of the home MNO or an operator's remote SIM provisioning platform (SM-DP+) address.

14. The method of claim 1, wherein the authentication credential comprises at least one of device information of the device and an authentication token used for interacting with the roaming MNO.

15. The method of claim 1, wherein the roaming MNO is located at or is available for providing a data networking service at the roaming location of the user.

16. The method of claim 1, wherein the first server and the home MNO are combined as one server.

17. The method of claim 1, wherein the roaming location of the user is detected by a global positioning system (GPS) sensor of the device.

18. The method of claim 1, wherein transmitting the home MNO information comprises transmitting the home MNO information retrieved from a subscriber identity module (SIM) of the device.

19. An apparatus for a roaming subscription with an embedded subscriber identity module (eSIM), the apparatus comprising:
- a global positioning system (GPS) sensor;
- a processor configured to:
  - receive a roaming subscription request comprising a roaming location of a user determined by the GPS sensor,
  - transmit, to a first server, home mobile network operator (MNO) information comprising at least one of a mobile country code (MCC) or a mobile network code (MNC),
  - retrieve home MNO data comprising an address of the home MNO from the first server based on the home MNO information,
  - request, to a home MNO, an authentication credential for a roaming MNO based on the home MNO data;
  - transmit the authentication credential to the roaming MNO,
  - receiving, from the home MNO, a link to the roaming MNO, and
  - establish a connection to the roaming MNO based on the link to the roaming MNO to initiate a network service at the roaming location; and
- a memory configured to store the home MNO information, the home MNO data, and the authentication credential.

20. A non-transitory computer readable medium embodying a computer program for operating an electronic device including a memory and a processor, the computer program comprising computer readable instructions that, when executed by the processor, cause the electronic device to:
- receive a roaming subscription request comprising a roaming location of a user determined by a global positioning system (GPS) sensor,
- transmit, to a first server, home mobile network operator (MNO) information comprising at least one of a mobile country code (MCC) or a mobile network code (MNC),
- retrieve home MNO data comprising an address of the home MNO from the first server based on the home MNO information,
- request, to a home MNO, an authentication credential for a roaming MNO based on the home MNO data;
- transmit the authentication credential to the roaming MNO,
- receive, from the home MNO, a link to the roaming MNO, and
- establish a connection to the roaming MNO based on the link to the roaming MNO to initiate a network service at the roaming location.

* * * * *